3,067,243
PREPARATION OF SALTS OF NAPHTHALENE SULFONIC ACID-FORMALDEHYDE CONDENSATES

Richard C. Richter, Westfield, and Harry A. Batley, Denville, N.J., assignors to Nopco Chemical Company, Harrison, N.J., a corporation of New Jersey
No Drawing. Filed July 28, 1959, Ser. No. 829,977
6 Claims. (Cl. 260—505)

The present invention relates to the preparation of salts of naphthalene sulfonic acid-formaldehyde condensates. More particularly, this invention relates to the preparation of salt free salts of naphthalene sulfonic acid-formaldehyde condensates.

The above product has been heretofore prepared by sulfonating naphthalene with excess sulfuric acid and thereafter condensing the resulting naphthalene sulfonic acid with formaldehyde. The condensate is then neutralized with, e.g., sodium hydroxide and the product, if desired, is treated to remove or reduce the water content, for instance by spray drying. This product has a large number of industrial uses such as pitch dispersants, emulsifiers, synthetic tanning agents, etc. The commercial products which are available contain from about 7% to 22% by weight of sodium sulfate. However, in many of these uses, especially in the rubber industry where this product is used as a polymerization emulsifier, a product which is pure, i.e., not discolored and free from sodium sulfate is required. The impurity, sodium sulfate, is present because the excess sulfuric acid employed in the sulfonation step is neutralized with sodium hydroxide. Attempts to eliminate this impurity by desalting have been suggested. For instance, this can be accomplished by chilling and filtering or by neutralizing with calcium hydroxide and filtering. However, such operations introduce additional manipulative steps as well as additional reagents and therefore are undesirable from a commercial viewpoint.

Accordingly, it is an object of the present invention to prepare the salts of naphthalene sulfonic acid-formaldehyde condensates in an improved manner.

It is a further object to prepare said product having an improved color and in a salt free condition without need for introducing additional manipulative steps and additional reagents.

Other objects will become apparent from the detailed description given hereinafter. It is intended, however, that the detailed description and specific example do not limit the invention, but merely indicate the preferred embodiments of the invention since various changes and modifications within the scope of the invention will become apparent to those skilled in the art.

We have unexpectedly discovered that the above and other objects can be achieved in the following manner. The naphthalene is first sulfonated with less than the stoichiometric amount of sulfuric acid normally required for this step. Thereafter, water is introduced into the resulting sulfonated product. The water will dissolve the water-soluble sulfonated naphthalene while the unsulfonated naphthalene plus water-insoluble impurities will form an immiscible layer therewith. The naphthalene sulfonic acid, in solution, is subsequently condensed with formaldehyde and finally neutralized with a neutralizing agent. The resulting product, a solution of the sodium salt of the naphthalene sulfonic acid-formaldehyde condensate can then be treated to reduce the water content, e.g., by evaporation or spray drying. The product is salt free, i.e., contains no residual sodium sulfate and is of good color, i.e., a pale yellow solid. A further unexpected advantage accruing from our process is that the sulfonation cycle is shortened and as a result better color of the final product and improved production efficiency is achieved. Moreover, this procedure has been found to permit higher ratios of formaldehyde to naphthalene sulfonic acid during the condensation step. Where attempts heretofore have been made to increase the formaldehyde content in prior art condensation procedures, it was found that a solid unworkable reaction mass was obtained under the normal operating temperatures and a normal water content of 40% to 60% which are utilized to assure an easily workable drying feed of the final neutralized product. When practicing the present invention, on the other hand, higher ratios of formaldehyde can be used with no difficulty. That is, the resulting condensate is easily handled under the operating temperatures and water content of the system. As a result of the increased ratio of formaldehyde, a more active resin can be obtained which has been found to be an outstanding carbon black dispersant.

It is known according to Spryskov (C.A. 41: 2720d) that the sulfonation of naphthalene can be carried out with a deficiency of acid. However, such knowledge does not suggest that when the present procedure is utilized to obtain a sulfonated naphthalene which is subsequently condensed with formaldehyde and neutralized, an outstanding salt-free product of good color is obtained. Neither does such prior art suggest that as a result of the suulfonating conditions disclosed herein increased quantities of formaldehyde can be used in the condensation with the naphthalene sulfonic acid.

The following example is illustrative of our process and is not to be construed in a limiting manner.

EXAMPLE

The materials and their quantities used in this example were:

| Materials | Gms. | Mols |
|---|---|---|
| Naphthalene | 1,087.5 | 8.5 |
| 100% sulfuric acid | 490.0 | 5.0 |
| 37% by weight aq. formaldehyde | 305.0 | 3.75 |
| 50% by weight aq. sodium hydroxide | 400.0 | 5.0 |
| Water | 1,905 | |

A. *Sulfonation*

The naphthalene (1087.5 grams) was melted in a flask and the temperature raised to 140° C. Thereafter, the sulfuric acid was rapidly run into the flask. This addition was accompanied by a spontaneous temperature rise to 163° C. During the course of two hours after the sulfuric acid addition, the temperature of the reaction mass, which turned cherry red and was accompanied by sublimation of the naphthalene, had dropped to 147° C. Then, the water (1905 grams) heated to 75° C., was slowly added. Slight refluxing occurred and the temperature dropped to 95° C. The contents of the flask were transferred to a large separatory funnel, the temperature of which was maintained at 95° C. Separation into two layers, i.e., a lower water layer which contained naphthalene sulfonic acid and an upper layer which contained unreacted naphthalene and impurities was complete in five minutes. However, one-half hour in the separatory funnel was allowed as a precautionary measure. Then the lower water layer which comprised 2890 grams of naphthalene sulfonic acid solution was drawn off. This solution which was an opalescent mass contained 35.0% by weight of solids which represented a naphthalene sulfonic acid recovery of 97.5%. From the top layer, 432 grams of reddish gray naphthalene were recovered. This amounted to 96.4% of the anticipated weight. Titrations carried out upon samples from the two layers after separation confirmed that the yield from the above sulfonation step, discounting obvious transference and sublimation losses, was virtually theoretical and that little or no residual sulfuric acid was present in the aqueous layer.

B. *Condensation*

The solution of naphthalene sulfonic acid, i.e., the separated aqueous layer, was maintained at a temperature of 90° C. while the aqueous formaldehyde solution (305 grams) was slowly added. No heat was evolved due to the addition. The resulting condensation mass was then maintained at temperatures between 90° to 100° C. for sixteen hours. At the end of this period only traces of formaldehyde odor remained. The product was the condensate of naphthalene sulfonic acid and formaldehyde.

C. *Neutralization*

The above condensation mass was gradually added with agitation to the 50% by weight aqueous sodium hydroxide solution (400 grams), the latter being chilled to temperatures between 40° and 50° C. The pH at neutralization was 7.5. In this manner 3500 grams of a thin brown solution was obtained. The solution contained a few white specks which were removed by filtration. The solution was then tray dried at 110° C. for 8 hours. The product which was the sodium salt of naphthalene sulfonic acid-formaldehyde condensate weighed 1120 grams and was a yellow brown granular mass in appearance. On analysis, the product showed no moisture and no sodium sulfate.

The yields were as follows:

|  | Gms. | Mols |
|---|---|---|
| Theoretical yield of product | 1,195 | 5 |
| Actual yield of product | ¹ 1,120 | |
| Theoretical naphthalene recovery | 448 | 3.5 |
| Actual naphthalene recovery | 432 | |

¹ 94% of theory.

In carrying out our process, from about 0.6 to 0.9 mol of sulfuric acid can be reacted with each mol of naphthalene. We prefer to use about 0.6 mol of sulfuric acid per mol of naphthalene. Concentrated or fuming sulfuric acid is used for the sulfonation reaction since any water which is introduced at this point in the process will retard the sulfonation reaction since it dissolves the acid, but not the naphthalene. The sulfonation can be carried out at temperatures of from 100° to 180° C. and for periods of times of from about ½ to 3 hours. Of course, the higher the reaction temperature, the shorter will be the reaction time. The amount of water which is added to the reaction mass after naphthalene sulfonic acid is formed can vary. It must be sufficient to dissolve all of the naphthalene sulfonic acid thereby removing it from the excess unreacted naphthalene. At the same time, it should not be so great an amount as to reduce the efficiency of the formaldehyde condensation or to lower the solids content below drying efficiency. For example, when 0.6 mol of sulfuric acid is used per mol of naphthalene, about 12.5 mols of water per mol of naphthalene has been found to be satisfactory.

In the condensation reaction, formaldehyde, paraformaldehyde, trioxane or any material liberating formaldehyde can be used. As a matter of convenience, a 37% by weight aqueous solution of formaldehyde is used since it is available commercially. The amount of formaldehyde utilized in the condensation reaction can vary from about 0.5 to 1.0 mol of formaldehyde per mol of naphthalene sulfuric acid. Condensation temperatures of from about 75° to 115° C. and reaction times for about 3 to 20 hours can be used.

The neutralization of the condensate can be accomplished by introducing, either as a solid or as an aqueous solution, a neutralizing agent. Useful neutralizing agents are sodium hydroxide, calcium hydroxide, barium hydroxide as well as zinc, lithium and magnesium hydroxides. In other words, any neutralizing agent can be used which forms a sulfonic acid salt. If a subsequent drying step to reduce or remove water is carried out, then the salt should be heat stable. The amount of neutralizing agent should be approximately the stoichiometric amount as a deficiency or an excess of alkali will result in an impure product. The neutralized product can be used in the form of its aqueous solution or the water can be reduced or removed entirely by spray, tray or drum drying.

Having described our invention what we claim as new and desire to secure by Letters Patent is:

1. A process for preparing a salt of a naphthalene sulfonic acid-formaldehyde condensate characterized by having a good color and being salt free which comprises the steps of (1) reacting at temperatures between about 100° to 180° from about 0.6 to 0.9 mol of sulfuric acid per mol of naphthalene, thereby obtaining a reaction mass containing naphthalene sulfonic acid plus unreacted naphthalene, (2) introducing water into said reaction mass thereby forming an aqueous layer which contains said naphthalene sulfonic acid and a layer containing unreacted naphthalene, (3) separating said aqueous layer containing said naphthalene sulfonic acid from said layer containing unreacted naphthalene, (4) condensing said naphthalene sulfonic acid with from about 0.5 to 1.0 mol of formaldehyde per mol of said naphthalene sulfonic acid, said formaldehyde being selected from the group consisting of formaldehyde and compounds liberating formaldehyde and thereafter (5) neutralizing the resulting naphthalene sulfonic acid-formaldehyde condensate thereby obtaining a neutralized salt of said naphthalene sulfonic acid-formaldehyde condensate.

2. The process of claim 1 including the step of spray drying said salt.

3. The process of claim 1 in which about 0.6 mol of sulfuric acid per mol of naphthalene is used.

4. The process of claim 3 in which about 12.5 mols of water are used to separate the resulting naphthalene sulfonic acid from said unreacted naphthalene.

5. The process of claim 3 in which said neutralizing agent is sodium hydroxide.

6. The process of claim 3 in which about 0.75 mol of formaldehyde are reacted with each mol of naphthalene sulfonic acid.

References Cited in the file of this patent

UNITED STATES PATENTS 2,179,371    Dyer _____ Nov. 7, 1939

OTHER REFERENCES

Spryskov et al.: J. Gen. Chem. (U.S.S.R.), vol. 16, pages 1060–1064 (1946); C.A., vol. 41, page 2720 (1947).

UNITED STATES PATENT OFFICE
CERTIFICATE OF CORRECTION

Patent No. 3,067,243             December 4, 1962

Richard C. Richter et al.

It is hereby certified that error appears in the above numbered patent requiring correction and that the said Letters Patent should read as corrected below.

Column 4, line 27, for "100° to 180° " read -- 100° to 180° C. --.

Signed and sealed this 25th day of February 1964.

(SEAL)
Attest:

ERNEST W. SWIDER             EDWIN L. REYNOLDS

Attesting Officer             Acting Commissioner of Patents